US010326993B2

(12) United States Patent
Boyce

(10) Patent No.: US 10,326,993 B2
(45) Date of Patent: Jun. 18, 2019

(54) ADAPTIVE WEIGHTING OF REFERENCE PICTURES IN VIDEO ENCODING

(71) Applicant: THOMSON Licensing, Issy les Moulineaux (FR)

(72) Inventor: Jill MacDonald Boyce, Portland, OR (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/895,760

(22) Filed: Feb. 13, 2018

(65) Prior Publication Data

US 2018/0176569 A1 Jun. 21, 2018

Related U.S. Application Data

(63) Continuation of application No. 15/348,408, filed on Nov. 10, 2016, now Pat. No. 9,930,335, which is a (Continued)

(51) Int. Cl.
*H04N 7/12* (2006.01)
*H04N 19/126* (2014.01)
(Continued)

(52) U.S. Cl.
CPC ......... *H04N 19/126* (2014.11); *H04N 19/105* (2014.11); *H04N 19/149* (2014.11);
(Continued)

(58) Field of Classification Search
CPC .... H04N 19/126; H04N 19/513; H04N 19/61; H04N 19/149; H04N 19/196;
(Continued)

(56) References Cited

U.S. PATENT DOCUMENTS 4,383,272 A 5/1983 Netravali et al.
4,985,768 A 1/1991 Sugiyama
(Continued)

FOREIGN PATENT DOCUMENTS

AU 2003249056 2/2004
AU 20100202727 7/2010
(Continued)

OTHER PUBLICATIONS

Kikuchi et al.: Experiment Result of Multi-Frame Interpolative Prediction with Default Coefficients:, JVT of ISO/IEC MPEG & ITU-T VCEG, Document: JVT-C067, JVT of ISO/IEC MPEG & ITU-T VCEG, 3rd Meeting: Fairfax, Virginia, USA, May 6-20, 2002.
(Continued)

*Primary Examiner* — Allen C Wong
(74) *Attorney, Agent, or Firm* — Brian J. Dorini; Xiaoan Lu

(57) ABSTRACT

A video decoder, encoder, and corresponding methods for processing video data for an image block and a particular reference picture index to predict the image block are disclosed that utilize adaptive weighting of reference pictures to enhance video compression, where a decoder includes a reference picture weighting factor unit for determining a weighting factor corresponding to the particular reference picture index; an encoder includes a reference picture weighting factor assignor for assigning a weighting factor corresponding to the particular reference picture index; and a method for decoding includes receiving a reference picture index with the data that corresponds to the image block, determining a weighting factor for each received reference picture index, retrieving a reference picture for each index, motion compensating the retrieved reference picture, and multiplying the motion compensated
(Continued)

reference picture by the corresponding weighting factor to form a weighted motion compensated reference picture.

15 Claims, 5 Drawing Sheets

Related U.S. Application Data continuation of application No. 14/225,614, filed on Mar. 26, 2014, now Pat. No. 9,549,191, which is a continuation of application No. 13/477,115, filed on May 22, 2012, now abandoned, which is a continuation of application No. 12/924,715, filed on Oct. 1, 2010, now Pat. No. 8,290,052, which is a continuation of application No. 10/410,456, filed on Apr. 9, 2003, now Pat. No. 8,406,301.

(60) Provisional application No. 60/395,874, filed on Jul. 15, 2002, provisional application No. 60/395,843, filed on Jul. 15, 2002.

(51) Int. Cl.
| | |
|---|---|
| *H04N 19/196* | (2014.01) |
| *H04N 19/105* | (2014.01) |
| *H04N 19/176* | (2014.01) |
| *H04N 19/172* | (2014.01) |
| *H04N 19/46* | (2014.01) |
| *H04N 19/513* | (2014.01) |
| *H04N 19/149* | (2014.01) |
| *H04N 19/61* | (2014.01) |
| *H04N 19/573* | (2014.01) |

(52) U.S. Cl.
CPC ......... *H04N 19/172* (2014.11); *H04N 19/176* (2014.11); *H04N 19/196* (2014.11); *H04N 19/197* (2014.11); *H04N 19/46* (2014.11); *H04N 19/513* (2014.11); *H04N 19/573* (2014.11); *H04N 19/61* (2014.11)

(58) Field of Classification Search
CPC .... H04N 19/573; H04N 19/46; H04N 19/172; H04N 19/176; H04N 19/105; H04N 19/197
USPC .................................................. 375/240.16
See application file for complete search history.

(56) References Cited

U.S. PATENT DOCUMENTS

| | | | |
|---|---|---|---|
| 5,089,889 A | 2/1992 | Sugiyama | |
| 5,301,019 A | 4/1994 | Citta | |
| 5,436,665 A | 7/1995 | Veno et al. | |
| 5,467,136 A | 11/1995 | Odaka et al. | |
| 5,488,482 A | 1/1996 | Ueda et al. | |
| 5,592,228 A | 1/1997 | Dachiku et al. | |
| 5,602,593 A | 2/1997 | Katto | |
| 5,691,770 A | 11/1997 | Keesman | |
| 5,767,907 A | 6/1998 | Pearlstein | |
| 5,778,097 A | 7/1998 | Nickerson | |
| 5,781,788 A | 7/1998 | Woo et al. | |
| 5,978,032 A | 11/1999 | Yukitake et al. | |
| 6,031,575 A * | 2/2000 | Suzuki | H04N 19/105 375/240.14 |
| 6,031,676 A | 2/2000 | Oenes et al. | |
| 6,049,362 A | 4/2000 | Butter et al. | |
| 6,081,551 A | 6/2000 | Etoh | |
| 6,097,842 A | 8/2000 | Suzuki et al. | |
| 6,104,439 A | 8/2000 | Jeong et al. | |
| 6,108,040 A | 8/2000 | Moteki et al. | |
| 6,111,991 A | 8/2000 | Ribas-Corbera | |
| 6,122,318 A | 9/2000 | Yamaguchi et al. | |
| 6,151,075 A | 11/2000 | Shin et al. | |
| 6,175,592 B1 | 1/2001 | Kim et al. | |
| 6,275,532 B1 | 8/2001 | Hibi et al. | |
| 6,292,514 B1 | 9/2001 | Yamaguchi et al. | |
| 6,292,515 B1 | 9/2001 | Kao et al. | |
| 6,414,992 B1 | 7/2002 | Sriram et al. | |
| 6,680,921 B1 | 1/2004 | Svanbro et al. | |
| 6,704,358 B1 | 3/2004 | Shipeng | |
| 6,754,269 B1 | 6/2004 | Yamaguchi et al. | |
| 6,782,054 B2 | 8/2004 | Bellers | |
| 7,266,150 B2 | 9/2007 | Demos | |
| 7,308,145 B2 | 12/2007 | Abe et al. | |
| 7,376,186 B2 | 5/2008 | Boyce et al. | |
| 7,450,643 B2 | 11/2008 | Chujoh et al. | |
| 7,515,637 B2 | 4/2009 | Payson | |
| 7,903,742 B2 | 3/2011 | Boyce | |
| 8,144,785 B2 | 3/2012 | Boyce | |
| 8,144,786 B2 | 3/2012 | MacDonald Boyce | |
| 8,144,787 B2 | 3/2012 | Boyce | |
| 8,149,924 B2 | 4/2012 | Boyce | |
| 8,155,208 B2 | 4/2012 | Boyce | |
| 8,290,050 B2 | 10/2012 | Boyce | |
| 8,290,051 B2 | 10/2012 | Boyce | |
| 8,290,052 B2 | 10/2012 | Boyce | |
| 8,290,053 B2 | 10/2012 | Boyce | |
| 8,295,354 B2 | 10/2012 | Boyce | |
| 8,406,301 B2 | 3/2013 | Boyce | |
| 2001/0043796 A1* | 11/2001 | Ishikawa | G11B 27/105 386/241 |
| 2002/0176503 A1 | 11/2002 | Matsunaga et al. | |
| 2003/0215014 A1 | 11/2003 | Koto et al. | |
| 2004/0008783 A1 | 1/2004 | Boyce | |
| 2004/0042552 A1 | 3/2004 | Dvorkovich et al. | |
| 2005/0105809 A1 | 5/2005 | Abe et al. | |
| 2010/0279667 A1 | 11/2010 | Wehrs et al. | |
| 2013/0185359 A1 | 7/2013 | Liu et al. | |
| 2014/0023144 A1 | 1/2014 | Park et al. | |

FOREIGN PATENT DOCUMENTS

| | | |
|---|---|---|
| CN | 1355984 | 6/2002 |
| CN | 1139256 | 2/2004 |
| EP | 0511778 | 11/1992 |
| EP | 0614318 | 9/1994 |
| EP | 0645930 | 5/1995 |
| EP | 1414245 | 4/2004 |
| GB | 23652246 | 2/2002 |
| JP | 8147948 | 5/1996 |
| JP | 09065342 | 3/1997 |
| JP | 10224795 | 8/1998 |
| JP | 11239351 | 8/1999 |
| JP | 2001309384 | 12/2001 |
| JP | 2002116718 | 4/2002 |
| JP | 2002340042 | 11/2002 |
| JP | 2003125409 | 4/2003 |
| JP | 2003189313 | 4/2003 |
| JP | 2004007379 | 1/2004 |
| JP | 2004007377 | 4/2004 |
| JP | 2006053633 | 2/2006 |
| KR | 101005215 | 1/2011 |
| RU | 209968 | 11/1997 |
| RU | 2123769 | 12/1998 |
| RU | 2182727 | 5/2002 |
| WO | WO9418799 | 8/1994 |
| WO | WO9705747 | 2/1997 |
| WO | WO0186962 | 11/2001 |
| WO | WO2004008642 | 1/2004 |
| WO | WO2004008761 | 1/2004 |
| WO | WO2004008762 | 1/2004 |
| WO | WO2005004492 | 1/2005 |

OTHER PUBLICATIONS

Kadono et al.: Result on Multi-frame interpolation Predication with modified Syntax:, Document: JVT-C047r1, JVT of ISO/IEC MPEG & ITU-T VCEG, 3rd meeting: Fairfax, Virginia, USA May 6-10, 2002.

(56) References Cited

OTHER PUBLICATIONS

Wiegand, Working Draft No. 2, Revision 2 (WD-2 rev.8), Joint Video Team (JVT) of ISO/IEC MPEG and ITU-T VCEG, Document: JVT-C039, 3rd meeting, Fairfax, Virginia, USA, May 6-10, 2002 pp. 1-112.
Kamikura et al.: "Global Brightness-Variation Compensation for Video Coding", IEEE Transactions on Circuits and Systems for Video Technology, vol. 8, No. 8, Dec. 1998.
Boyce: "Adaptive Reference Weighting Using Reference Picture Index," JVT of ISO/IEC PEG & ITU-T VCEG Document JVT-D122, 4th Meeting: Klagenfurt, Austria, Jul. 22-26, 2002, pp. 1-7.
Kikuchi et al.: "Interpolation Coefficient Adaptation in Multi-Frame interpolative prediction", JVT of ISO/IEC MPEG & ITU-T VCEG, Document: JVT-C103, 3rd Meeting: Fairfax, VA, Mar. 6-10, 2002, ages 1-13.
Smith et al.: "Protecting a Private Network: The AltaVista Firewall". Digital Technical Journal, vol. 9, No. 2, 1997, 32 pages.
Budagavi et al.: "Multiframe Block Motion Compensated Video Coding for Wireless Channels". Department of Electrical Engineering, Texas A&M University, Mar. 11, 1996, pp. 953-957.
ITU-T Telecommunication Standardization Sector of ITU, H.263 Annex U. Series H: Audiovisual and Multimedia Systems, Nov. 2000, 35 pages.
Kikuchi et al.: "Multi-frame interpolative prediction with modified syntax", JVT of ISO/IEC MPEG & ITU-T VCEG 3rd meeting: JVT-0066, Fairfax, Virginia, USA Mar. 6-10, 2002, pp. 1-13.
Karczewicz et al.: ITU-Telecommuniation Standardization Sector Study Group 16, Nokia Research Center, 7, Tenth meeting: Osaka, May 2000, 67 pages.
Kikuchi et al.: "Improved Multiple Frame Motion Using Frame Interpolation", JVT of ISO/IEC MPEG & ITU-T VCEG, Document: JVT-B075, 2nd Meeting: Geneva, CH, Jan. 29-Feb. 1, 2002, 8 pages.
Boyce: "Weighted Prediction Clean-up", JVT of ISO/IEC MPEG & ITU-T VCEG, Document: JVT-F034, 6th meeting: Awaji Island, JP, Dec. 5-13, 2002, pp. 1-7.
Wiegand, Draft ISO/IEC 14496-10: 2002 (E), "Editors Proposed Changes Relative to JVT-E 146d37ncm, revision 4", JVT of ISO/IEC MPEG & ITU-T VCEG, Document: JVT-F100d1, 6th meeting: Awaji Island, JP, Dec. 5-13, 2002.
Wiegand, Draft ISO/IEC 14496-10: 2002 (E), Document: JVT-C 167, Fairfax, VA., May 10, 2002.
Wiegand, Working Draft No. 2, Revision 2 (WD-2), Joint Video Team JVT of ISO/IEC MPEG and ITU-T VCEG, Document: JVT B118r2, Geneva, Switzerland, Jan. 29-Feb. 1, 2002, pp. 1-106.
Boyce, "Changes to Adaptive Reference Picture Weighting", JVT of ISO/IEC MPEG 7 ITU-U VCEG, Document JVT-E060, 5th meeting: Geneva, CH, Oct. 9-17, 2002, pp. 1-7.
Hannuksela, Generalized B/MH-Picture Averaging:, 3rd JVT Meeting, 60th MPEG meeting, May 6-10, 2002, Joint Video Team of ISO/IEC JTC1/SC29WG11 and ITU-T SG 16, No. JVT-0077, May 10, 2002, pp. 1-8.
Wiegand: Joint Final Committee Draft (JFCD) of Joint Video Specification (ITU-T Rec. H.264/ISO/IEC 14496-10 AVC), JVT-D157, 4th meeting: Klagenfurt, Austria, Jul. 22-26, 2002, 11 pages.
Wiegand: Text of Final Committee Draft of Joint Video Specification (ITU-T Rec. H.265/ISO/IEC 14496-10 AVC), MPEG02/N4920, JTC1/SC29/WG11, Klagenfurt, AT, Jul. 2002, 207 pages.
Communication Standards Review: Report of JVT meeting #3, SIO/IEC JTC1/SC29/WG11 (MPEG) and ITU-T SG16 Q6 (VCEG), May 6-10, 2002, 52 pages, Fairfax, VA.
He et al: H.26L-Based Fine Granularity Scalable Video Coding, IEEE, 2002, pp. 548-551.
Wiegand: JVT-G050: ISO/IEC MPEG & ITU-T VCEG, 7th Meeting: Pattaya, Thailand, Mar. 7-14, 2003, 264 pages.
Wiegand: "ITU Telecommunications Standardization Sector" Document VCEG-N83 d1. H.26L Test Model Long-Term No. 9 (TML-9) draft0. Dec. 21, 2001, 79 pages.
Sullivan et al.: "JVT (of ISO/IEC MPEG and ITU-T 0.6/16 VCEG) 2nd Meeting Report, Jan. 29-Feb. 1, 2002." ITU-T Temporary Document 22 (WP3/13) Study Group 16, 65 pages, Geneva, Feb. 5-15, 2002.
Liu et al.: "MCI-embedded Motion Compensated Prediction for Quality Enhancement of Frame Interpolation", In SPIE Proceedings of International Symposium on Voice, Video, and Data Communications, Multimedia Systems and Applications III, 2000, 11 pages.

\* cited by examiner

ADAPTIVE WEIGHTING OF REFERENCE PICTURES IN VIDEO ENCODING

CROSS-REFERENCE TO RELATED APPLICATIONS

This application is a continuation application of U.S. Non-Provisional patent application Ser. No. 15/348,408, filed Nov. 10, 2016, which is a continuation of U.S. Non-Provisional patent application Ser. No. 14/225,614, filed Mar. 26, 2014 (U.S. Pat. No. 9,549,191); which is itself a continuation application of U.S. Non-Provisional patent application Ser. No. 13/477,115, filed May 22, 2012, which is itself a continuation of U.S. Non-Provisional patent application Ser. No. 12/924,715, filed Oct. 1, 2010 (U.S. Pat. No. 8,290,052), which is itself a continuation of U.S. Non-Provisional patent application Ser. No. 10/410,456, filed Apr. 9, 2003 (U.S. Pat. No. 8,406,301); which claims the benefit of U.S. Provisional Patent Application Ser. No. 60/395,843 filed Jul. 15, 2002; and also U.S. Provisional Patent Application Ser. No. 60/395,874 filed Jul. 15, 2002, and all of which are incorporated by reference herein in their respective entireties.

FIELD OF THE INVENTION

The present invention is directed towards video encoders and in particular, towards adaptive weighting of reference pictures in video encoders.

BACKGROUND OF THE INVENTION

Video data is generally processed and transferred in the form of bit streams. Typical video compression coders and decoders ("CODECs") gain much of their compression efficiency by forming a reference picture prediction of a picture to be encoded, and encoding the difference between the current picture and the prediction. The more closely that the prediction is correlated with the current picture, the fewer bits that are needed to compress that picture, thereby increasing the efficiency of the process. Thus, it is desirable for the best possible reference picture prediction to be formed.

In many video compression standards, including Moving Picture Experts Group ("MPEG")-1, MPEG-2 and MPEG-4, a motion compensated version of a previous reference picture is used as a prediction for the current picture, and only the difference between the current picture and the prediction is coded. When a single picture prediction ("P" picture) is used, the reference picture is not scaled when the motion compensated prediction is formed. When bi-directional picture predictions ("B" pictures) are used, intermediate predictions are formed from two different pictures, and then the two intermediate predictions are averaged together, using equal weighting factors of (½, ½) for each, to form a single averaged prediction. In these MPEG standards, the two reference pictures are always one each from the forward direction and the backward direction for B pictures.

SUMMARY OF THE INVENTION

These and other drawbacks and disadvantages of the prior art are addressed by a system and method for adaptive weighting of reference pictures in video coders and decoders.

A video encoder for encoding video data for an image block and a particular reference picture index, the reference picture index used for encoding the image block, the encoder assigning an offset corresponding to the particular reference picture index. The particular reference picture index independently indicates, without use of another index, (1) a particular reference picture corresponding to the particular reference picture index and (2) the offset corresponding to the particular reference picture index.

BRIEF DESCRIPTION OF THE DRAWINGS

Adaptive weighting of reference pictures in video coders and decoders in accordance with the principles of the present invention are shown in the following exemplary figures, in which.

DETAILED DESCRIPTION OF PREFERRED EMBODIMENTS

Figure 1:
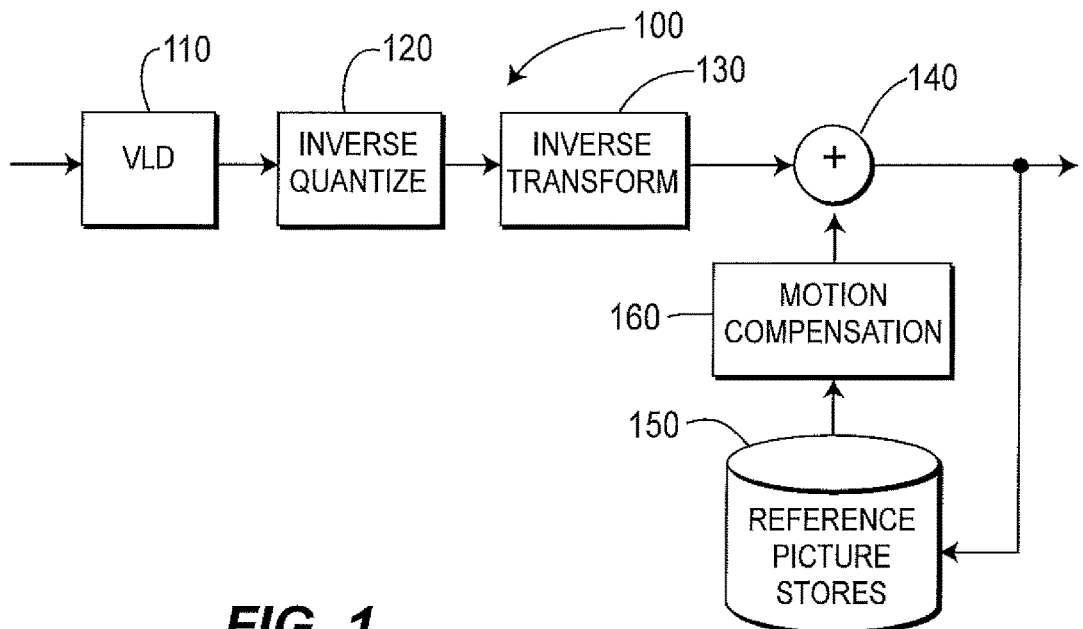
FIG. 1 shows a block diagram for a standard video decoder.

The present invention presents an apparatus and method for motion vector estimation and adaptive reference picture weighting factor assignment. In some video sequences, in particular those with fading, the current picture or image block to be coded is more strongly correlated to a reference picture scaled by a weighting factor than to the reference picture itself. Video CODECs without weighting factors applied to reference pictures encode fading sequences very inefficiently. When weighting factors are used in encoding, a video encoder needs to determine both weighting factors and motion vectors, but the best choice for each of these depends on the other, with motion estimation typically being the most computationally intensive part of a digital video compression encoder.

In the proposed Joint Video Team ("JVT") video compression standard, each P picture can use multiple reference pictures to form a picture's prediction, but each individual motion block or 8×8 region of a macroblock uses only a single reference picture for prediction. In addition to coding and transmitting the motion vectors, a reference picture index is transmitted for each motion block or 8×8 region, indicating which reference picture is used. A limited set of possible reference pictures is stored at both the encoder and decoder, and the number of allowable reference pictures is transmitted.

In the JVT standard, for bi-predictive pictures (also called "B" pictures), two predictors are formed for each motion block or 8×8 region, each of which can be from a separate reference picture, and the two predictors are averaged together to form a single averaged predictor. For bi-predictively coded motion blocks, the reference pictures can both be from the forward direction, both be from the backward direction, or one each from the forward and backward directions. Two lists are maintained of the available reference pictures that may used for prediction. The two reference pictures are referred to as the list 0 and list 1 predictors. An index for each reference picture is coded and transmitted, ref_idx_l0 and ref_idx_l1, for the list 0 and list 1 reference pictures, respectively. Joint Video Team ("JVT") bi-predictive or "B" pictures allows adaptive weighting between the two predictions, i.e., $$Pred=[(P0)(Pred0)]+[(P1)(Pred1)]+D,$$

where P0 and P1 are weighting factors, Pred0 and Pred1 are the reference picture predictions for list 0 and list 1 respectively, and D is an offset.

Two methods have been proposed for indication of weighting factors. In the first, the weighting factors are determined by the directions that are used for the reference pictures. In this method, if the ref_idx_l0 index is less than or equal to ref_idx_l1, weighting factors of (½, ½) are used, otherwise (2, −1) factors are used.

In the second method offered, any number of weighting factors is transmitted for each slice. Then a weighting factor index is transmitted for each motion block or 8×8 region of a macroblock that uses bi-directional prediction. The decoder uses the received weighting factor index to choose the appropriate weighting factor, from the transmitted set, to use when decoding the motion block or 8×8 region. For example, if three weighting factors were sent at the slice layer, they would correspond to weight factor indices 0, 1 and 2, respectively.

The following description merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, a standard video decoder is indicated generally by the reference numeral 100. The video decoder 100 includes a variable length decoder ("VLD") 110 connected in signal communication with an inverse quantizer 120. The inverse quantizer 120 is connected in signal communication with an inverse transformer 130. The inverse transformer 130 is connected in signal communication with a first input terminal of an adder or summing junction 140, where the output of the summing junction 140 provides the output of the video decoder 100. The output of the summing junction 140 is connected in signal communication with a reference picture store 150. The reference picture store 150 is connected in signal communication with a motion compensator 160, which is connected in signal communication with a second input terminal of the summing junction 140.

Figure 2:
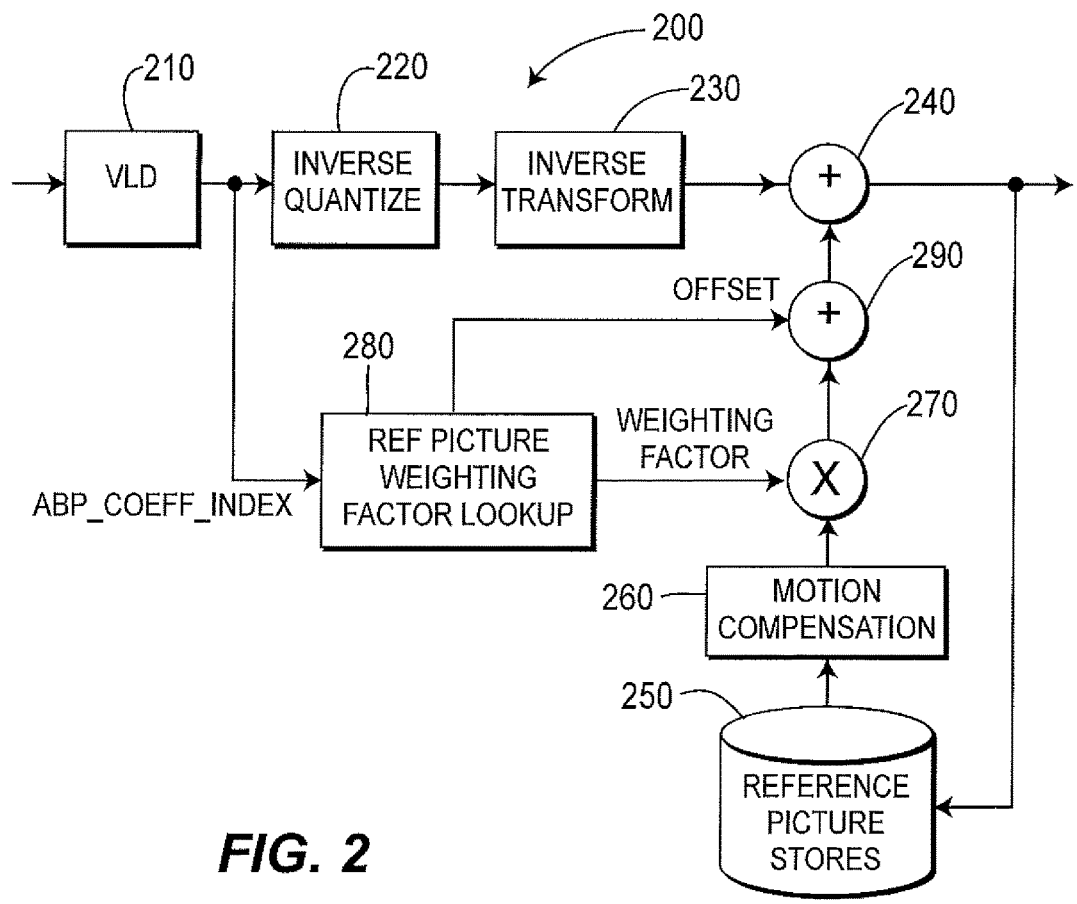
FIG. 2 shows a block diagram for a video decoder with adaptive bi-prediction.

Turning to FIG. 2, a video decoder with adaptive bi-prediction is indicated generally by the reference numeral 200. The video decoder 200 includes a VLD 210 connected in signal communication with an inverse quantizer 220. The inverse quantizer 220 is connected in signal communication with an inverse transformer 230. The inverse transformer 230 is connected in signal communication with a first input terminal of a summing junction 240, where the output of the summing junction 240 provides the output of the video decoder 200. The output of the summing junction 240 is connected in signal communication with a reference picture store 250. The reference picture store 250 is connected in signal communication with a motion compensator 260, which is connected in signal communication with a first input of a multiplier 270.

The VLD 210 is further connected in signal communication with a reference picture weighting factor lookup 280 for providing an adaptive bi-prediction ("ABP") coefficient index to the lookup 280. A first output of the lookup 280 is for providing a weighting factor, and is connected in signal communication to a second input of the multiplier 270. The output of the multiplier 270 is connected in signal communication to a first input of a summing junction 290. A second output of the lookup 280 is for providing an offset, and is connected in signal communication to a second input of the summing junction 290. The output of the summing junction 290 is connected in signal communication with a second input terminal of the summing junction 240.

Figure 3:
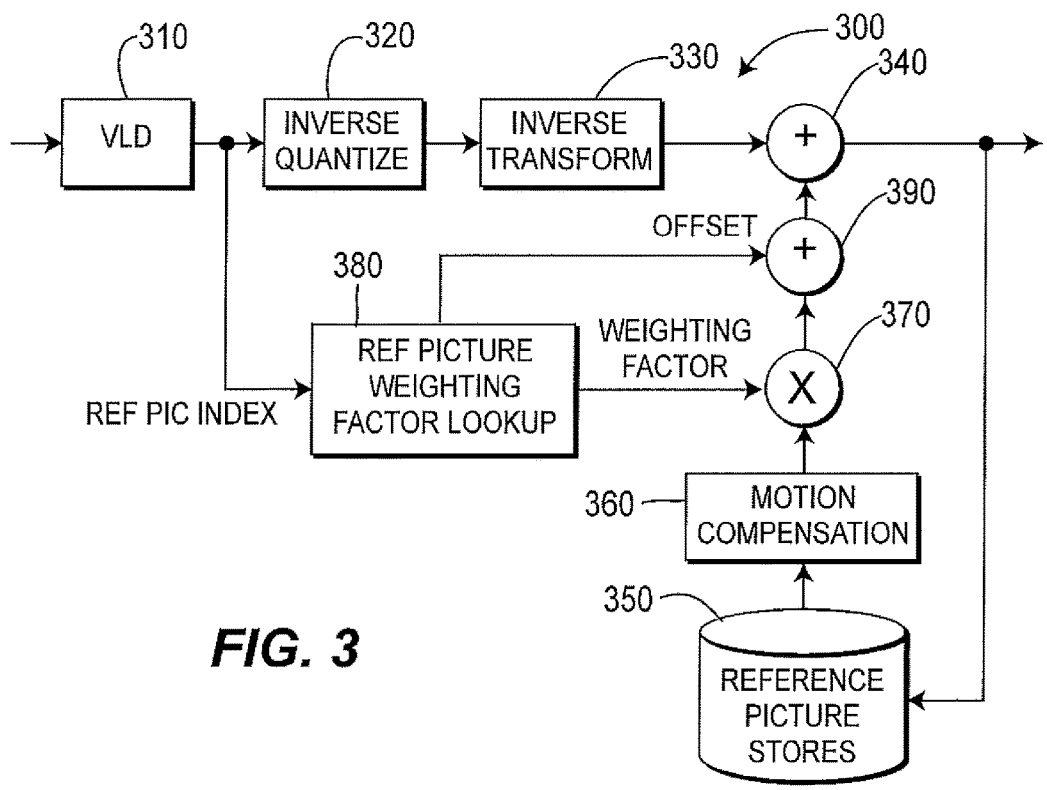
FIG. 3 shows a block diagram for a video decoder with reference picture weighting in accordance with the principles of the present invention.

Turning now to FIG. 3, a video decoder with reference picture weighting is indicated generally by the reference numeral 300. The video decoder 300 includes a VLD 310 connected in signal communication with an inverse quantizer 320. The inverse quantizer 320 is connected in signal communication with an inverse transformer 330. The inverse transformer 330 is connected in signal communication with a first input terminal of a summing junction 340, where the output of the summing junction 340 provides the output of the video decoder 300. The output of the summing junction 340 is connected in signal communication with a reference picture store 350. The reference picture store 350 is connected in signal communication with a motion compensator 360, which is connected in signal communication with a first input of a multiplier 370.

The VLD 310 is further connected in signal communication with a reference picture weighting factor lookup 380 for providing a reference picture index to the lookup 380. A first output of the lookup 380 is for providing a weighting factor, and is connected in signal communication to a second input of the multiplier 370. The output of the multiplier 370 is connected in signal communication to a first input of a summing junction 390. A second output of the lookup 380 is for providing an offset, and is connected in signal communication to a second input of the summing junction 390. The output of the summing junction 390 is connected in signal communication with a second input terminal of the summing junction 340.

Figure 4:
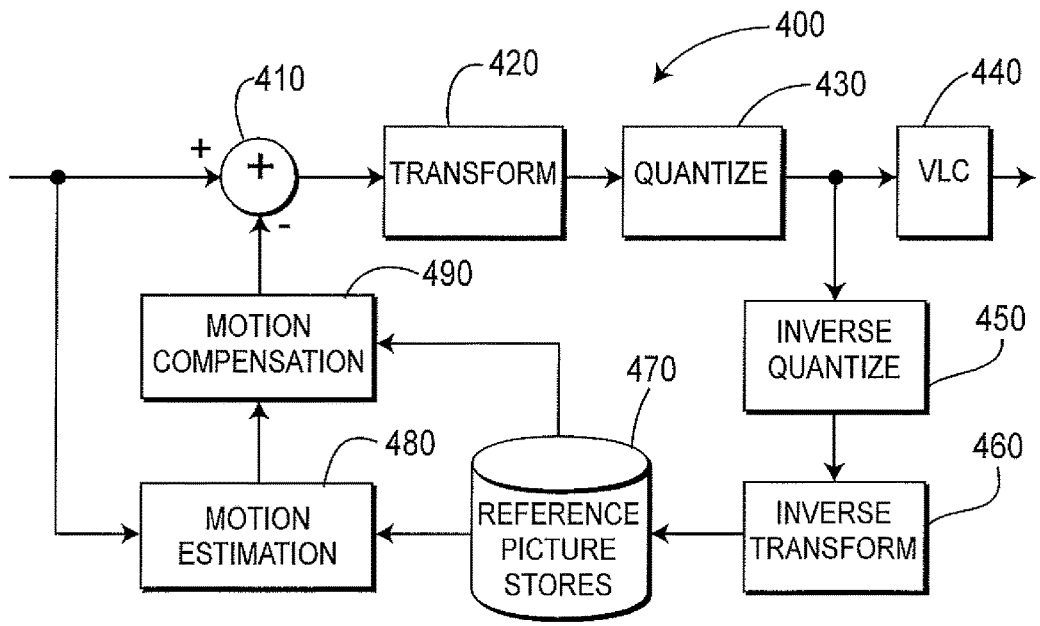
FIG. 4 shows a block diagram for a standard video encoder.

As shown in FIG. 4, a standard video encoder is indicated generally by the reference numeral 400. An input to the encoder 400 is connected in signal communication with a non-inverting input of a summing junction 410. The output of the summing junction 410 is connected in signal communication with a block transformer 420. The transformer 420 is connected in signal communication with a quantizer 430. The output of the quantizer 430 is connected in signal communication with a variable length coder ("VLC") 440, where the output of the VLC 440 is an externally available output of the encoder 400.

The output of the quantizer 430 is further connected in signal communication with an inverse quantizer 450. The inverse quantizer 450 is connected in signal communication with an inverse block transformer 460, which, in turn, is connected in signal communication with a reference picture store 470. A first output of the reference picture store 470 is connected in signal communication with a first input of a motion estimator 480. The input to the encoder 400 is further connected in signal communication with a second input of the motion estimator 480. The output of the motion estimator 480 is connected in signal communication with a first input of a motion compensator 490. A second output of the reference picture store 470 is connected in signal communication with a second input of the motion compensator 490. The output of the motion compensator 490 is connected in signal communication with an inverting input of the summing junction 410.

Figure 5:
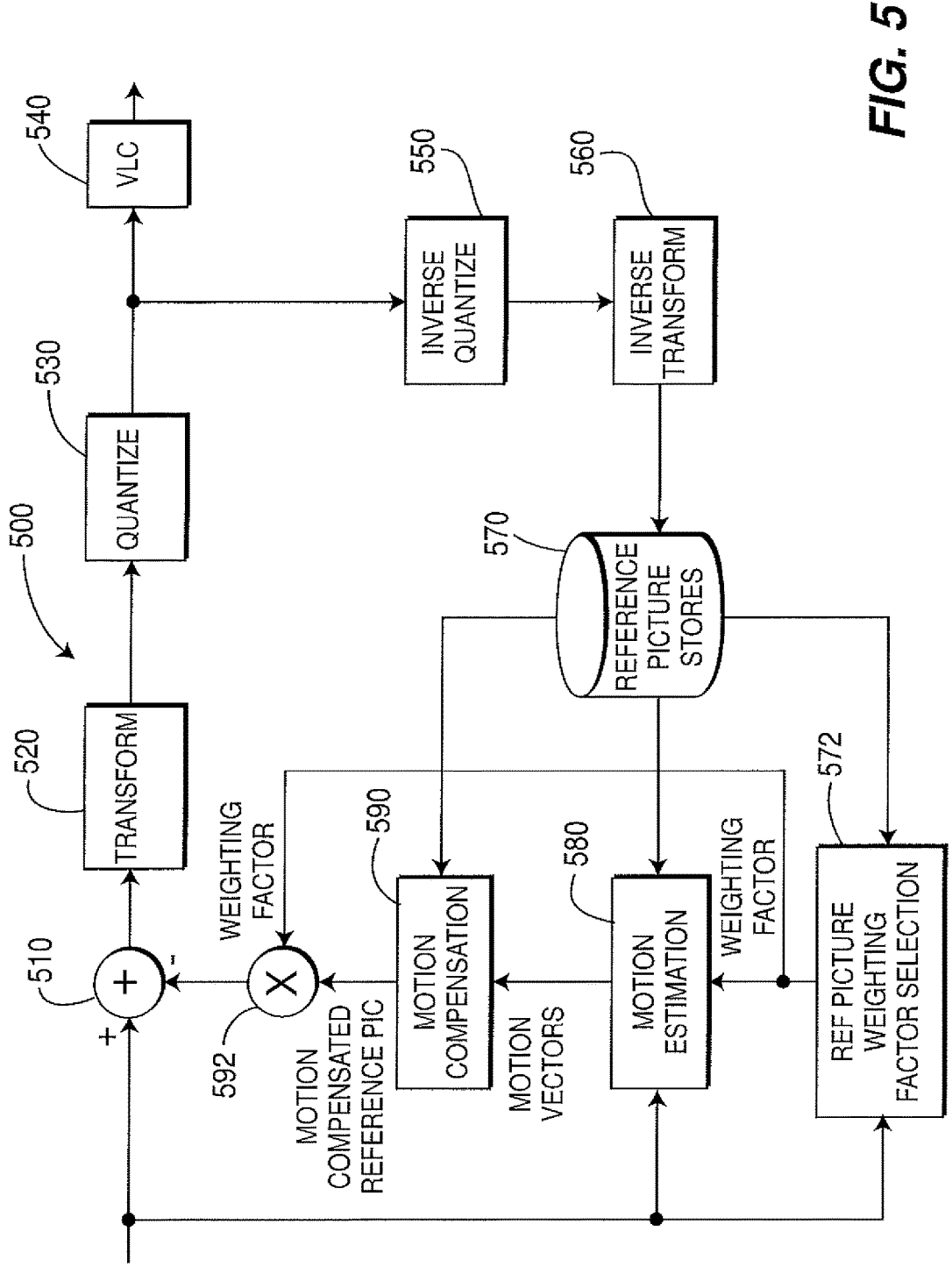
FIG. 5 shows a block diagram for a video encoder with reference picture weighting in accordance with the principles of the present invention.

Turning to FIG. 5, a video encoder with reference picture weighting is indicated generally by the reference numeral 500. An input to the encoder 500 is connected in signal communication with a non-inverting input of a summing junction 510. The output of the summing junction 510 is connected in signal communication with a block transformer 520. The transformer 520 is connected in signal communication with a quantizer 530. The output of the quantizer 530 is connected in signal communication with a VLC 540, where the output of the VLC 440 is an externally available output of the encoder 500.

The output of the quantizer 530 is further connected in signal communication with an inverse quantizer 550. The inverse quantizer 550 is connected in signal communication with an inverse block transformer 560, which, in turn, is connected in signal communication with a reference picture store 570. A first output of the reference picture store 570 is connected in signal communication with a first input of a reference picture weighting factor assignor 572. The input to the encoder 500 is further connected in signal communication with a second input of the reference picture weighting factor assignor 572. The output of the reference picture weighting factor assignor 572, which is indicative of a weighting factor, is connected in signal communication with a first input of a motion estimator 580. A second output of the reference picture store 570 is connected in signal communication with a second input of the motion estimator 580.

The input to the encoder 500 is further connected in signal communication with a third input of the motion estimator 580. The output of the motion estimator 580, which is indicative of motion vectors, is connected in signal communication with a first input of a motion compensator 590. A third output of the reference picture store 570 is connected in signal communication with a second input of the motion compensator 590. The output of the motion compensator 590, which is indicative of a motion compensated reference picture, is connected in signal communication with a first input of a multiplier 592. The output of the reference picture weighting factor assignor 572, which is indicative of a weighting factor, is connected in signal communication with a second input of the multiplier 592. The output of the multiplier 592 is connected in signal communication with an inverting input of the summing junction 510.

Figure 6:
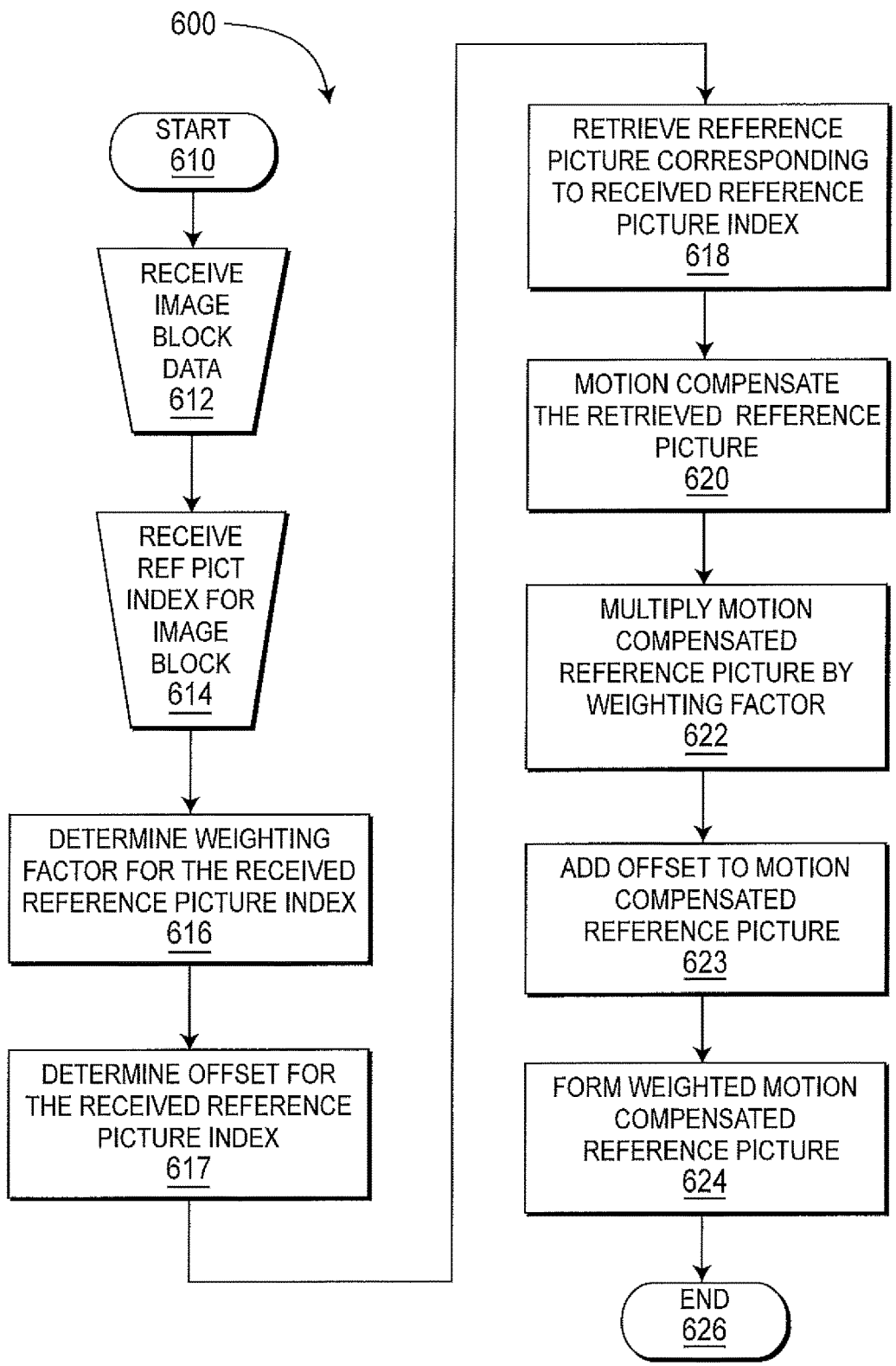
FIG. 6 shows a flowchart for a decoding process in accordance with the principles of the present invention.

Turning now to FIG. 6, an exemplary process for decoding video signal data for an image block is indicated generally by the reference numeral 600. The process includes a start block 610 that passes control to an input block 612. The input block 612 receives the image block compressed data, and passes control to an input block 614. The input block 614 receives at least one reference picture index with the data for the image block, each reference picture index corresponding to a particular reference picture. The input block 614 passes control to a function block 616, which determines a weighting factor corresponding to each of the received reference picture indices, and passes control to an optional function block 617. The optional function block 617 determines an offset corresponding to each of the received reference picture indices, and passes control to a function block 618. The function block 618 retrieves a reference picture corresponding to each of the received reference picture indices, and passes control to a function block 620. The function block 620, in turn, motion compensates the retrieved reference picture, and passes control to a function block 622. The function block 622 multiplies the motion compensated reference picture by the corresponding weighting factor, and passes control to an optional function block 623. The optional function block 623 adds the motion compensated reference picture to the corresponding offset, and passes control to a function block 624. The function block 624, in turn, forms a weighted motion compensated reference picture, and passes control to an end block 626.

Figure 7:
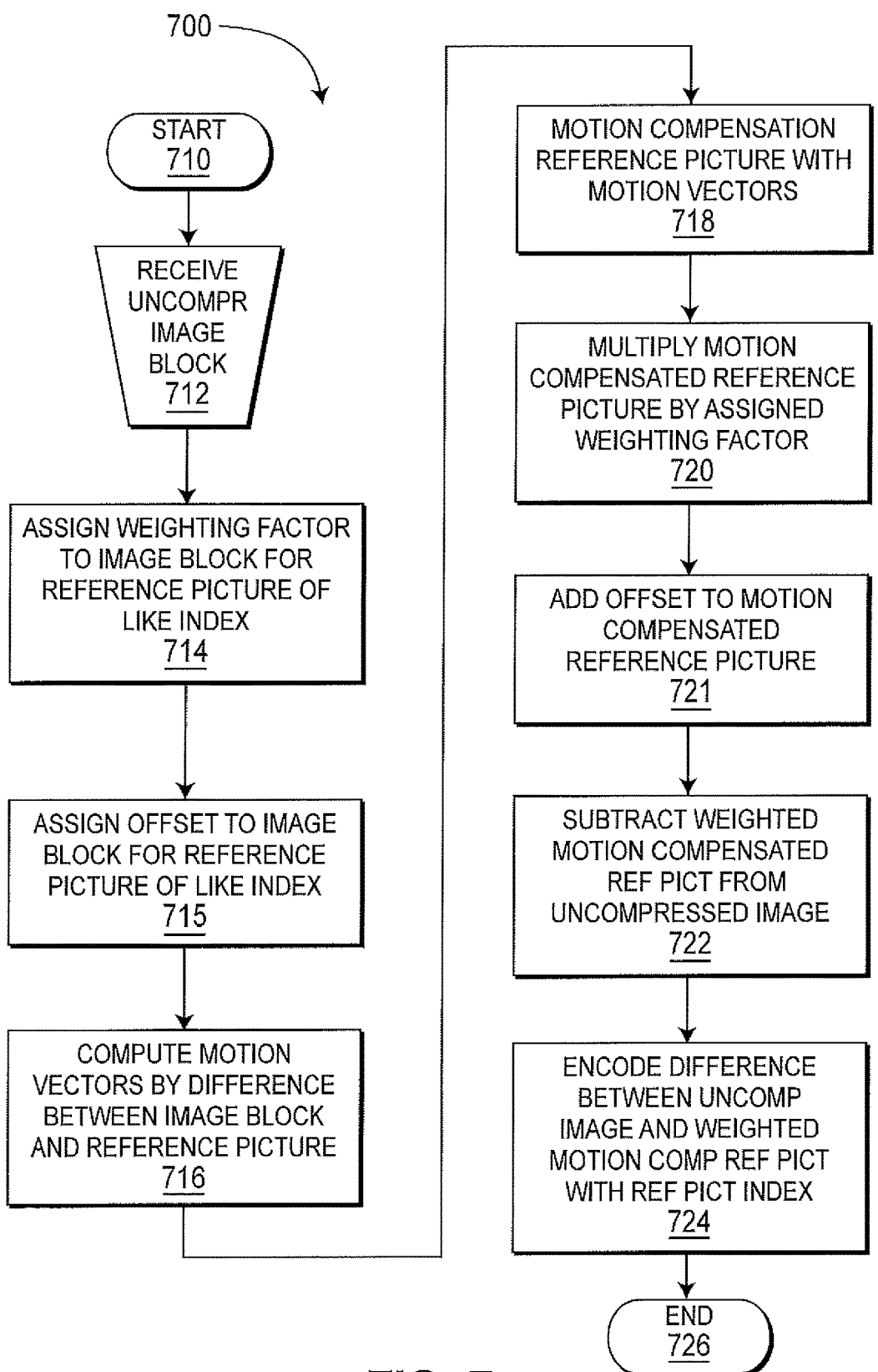
FIG. 7 shows a flowchart for an encoding process in accordance with the principles of the present invention.

Turning now to FIG. 7, an exemplary process for encoding video signal data for an image block is indicated generally by the reference numeral 700. The process includes a start block 710 that passes control to an input block 712. The input block 712 receives substantially uncompressed image block data, and passes control to a function block 714. The function block 714 assigns a weighting factor for the image block corresponding to a particular reference picture having a corresponding index. The function block 714 passes control to an optional function block 715. The optional function block 715 assigns an offset for the image block corresponding to a particular reference picture having a corresponding index. The optional function block 715 passes control to a function block 716, which computes motion vectors corresponding to the difference between the image block and the particular reference picture, and passes control to a function block 718. The function block 718 motion compensates the particular reference picture in correspondence with the motion vectors, and passes control to a function block 720. The function block 720, in turn, multiplies the motion compensated reference picture by the assigned weighting factor to form a weighted motion compensated reference picture, and passes control to an optional function block 721. The optional function block 721, in turn, adds the motion compensated reference picture to the assigned offset to form a weighted motion compensated reference picture, and passes control to a function block 722. The function block 722 subtracts the weighted motion compensated reference picture from the substantially uncompressed image block, and passes control to a function block 724. The function block 724, in turn, encodes a signal with the difference between the substantially uncompressed image block and the weighted motion compensated reference picture along with the corresponding index of the particular reference picture, and passes control to an end block 726.

In the present exemplary embodiment, for each coded picture or slice, a weighting factor is associated with each allowable reference picture that blocks of the current picture can be encoded with respect to. When each individual block in the current picture is encoded or decoded, the weighting factor(s) and offset(s) that correspond to its reference picture indices are applied to the reference prediction to form a weight predictor. All blocks in the slice that are coded with respect to the same reference picture apply the same weighting factor to the reference picture prediction.

Whether or not to use adaptive weighting when coding a picture can be indicated in the picture parameter set or sequence parameter set, or in the slice or picture header. For each slice or picture that uses adaptive weighting, a weighting factor may be transmitted for each of the allowable reference pictures that may be used for encoding this slice or picture. The number of allowable reference pictures is transmitted in the slice header. For example, if three reference pictures can be used to encode the current slice, up to three weighting factors are transmitted, and they are associated with the reference picture with the same index.

If no weighting factors are transmitted, default weights are used. In one embodiment of the current invention, default weights of (½, ½) are used when no weighting factors are transmitted. The weighting factors may be transmitted using either fixed or variable length codes.

Unlike typical systems, each weighting factor that is transmitted with each slice, block or picture corresponds to a particular reference picture index. Previously, any set of weighting factors transmitted with each slice or picture were not associated with any particular reference pictures. Instead, an adaptive bi-prediction weighting index was transmitted for each motion block or 8×8 region to select which of the weighting factors from the transmitted set was to be applied for that particular motion block or 8×8 region.

In the present embodiment, the weighting factor index for each motion block or 8×8 region is not explicitly transmitted. Instead, the weighting factor that is associated with the transmitted reference picture index is used. This dramatically reduces the amount of overhead in the transmitted bitstream to allow adaptive weighting of reference pictures.

This system and technique may be applied to either Predictive "P" pictures, which are encoded with a single predictor, or to Bi-predictive "B" pictures, which are encoded with two predictors. The decoding processes, which are present in both encoder and decoders, are described below for the P and B picture cases. Alternatively, this technique may also be applied to coding systems using the concepts similar to I, B, and P pictures.

The same weighting factors can be used for single directional prediction in B pictures and for bi-directional prediction in B pictures. When a single predictor is used for a macroblock, in P pictures or for single directional prediction in B pictures, a single reference picture index is transmitted for the block. After the decoding process step of motion compensation produces a predictor, the weighting factor is applied to predictor. The weighted predictor is then added to the coded residual, and clipping is performed on the sum, to form the decoded picture. For use for blocks in P pictures or for blocks in B pictures that use only list 0 prediction, the weighted predictor is formed as:

$$Pred=W0*Pred0+D0 \quad (1)$$

where W0 is the weighting factor associated with the list 0 reference picture, D0 is the offset associated with the list 0 reference picture, and Pred0 is the motion-compensated prediction block from the list 0 reference picture.

For use for blocks in B pictures which use only list 0 prediction, the weighted predictor is formed as:

$$Pred=W1*Pred1+D1 \quad (2)$$

where W1 is the weighting factor associated with the list 1 reference picture, D0 is the offset associated with the list 1 reference picture, and Pred1 is the motion-compensated prediction block from the list 1 reference picture.

The weighted predictors may be clipped to guarantee that the resulting values will be within the allowable range of pixel values, typically 0 to 255. The precision of the multiplication in the weighting formulas may be limited to any pre-determined number of bits of resolution.

In the bi-predictive case, reference picture indexes are transmitted for each of the two predictors. Motion compensation is performed to form the two predictors. Each predictor uses the weighting factor associated with its reference picture index to form two weighted predictors. The two weighted predictors are then averaged together to form an averaged predictor, which is then added to the coded residual.

For use for blocks in B pictures that use list 0 and list 1 predictions, the weighted predictor is formed as:

$$Pred=(P0*Pred0+D0+P1*Pred1+D1)/2 \quad (3)$$

Clipping may be applied to the weighted predictor or any of the intermediate values in the calculation of the weighted predictor to guarantee that the resulting values will be within the allowable range of pixel values, typically 0 to 255.

Thus, a weighting factor is applied to the reference picture prediction of a video compression encoder and decoder that uses multiple reference pictures. The weighting factor adapts for individual motion blocks within a picture, based on the reference picture index that is used for that motion block. Because the reference picture index is already transmitted in the compressed video bitstream, the additional overhead to adapt the weighting factor on a motion block basis is dramatically reduced. All motion blocks that are coded with respect to the same reference picture apply the same weighting factor to the reference picture prediction.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for video decoding, comprising:
receiving, in a bitstream, a signal indicative of a number of one or more reference pictures allowed to be used for predicting a plurality of image blocks of a picture;
receiving, in said bitstream, a signal indicative of a weighting factor for each slice or each picture of said one or more reference pictures, and said one or more reference pictures including a single reference picture for predicting an image block of said picture;
predicting said image block, using said single reference picture and the weighting factor received for said single reference picture; and
decoding said image block based on said predicted image block.

2. The method of claim 1, said predicting comprising:
generating a motion compensated predictor for said image block using said single reference picture; and
weighting said motion compensated predictor using said weighting factor received for said single reference picture.

3. The method of claim 2, said decoding comprising:
adding said weighted motion compensated predictor to residual data for said image block.

4. The method of claim 1, wherein a plurality of reference pictures are used for predicting said plurality of image blocks of said picture, and wherein a reference picture index indicates which reference picture is used for predicting said image block.

5. The method of claim 1, wherein said number of one or more reference pictures is included in a slice header.

6. An apparatus for video decoding, comprising:
at least one memory and one or more processors coupled to said at least one memory, wherein said one or more processors are configured to:
receive, in a bitstream, a signal indicative of a number of one or more reference pictures allowed to be used for predicting a plurality of image blocks of a picture;
receive, in said bitstream, a signal indicative of a weighting factor for each slice or each picture of said one or more reference pictures, and said one or more reference pictures including a single reference picture for predicting an image block of said picture;
predict said image block, using said single reference picture and the weighting factor received for said single reference picture; and
decode said image block based on said predicted image block.

7. The apparatus of claim 6, wherein said one or more processors are configured to:
generate a motion compensated predictor for said image block using said single reference picture; and
weight said motion compensated predictor using said weighting factor received for said single reference picture.

8. The apparatus of claim 7, wherein said one or more processors are further configured to:
add said weighted motion compensated predictor to residual data for said image block.

9. The apparatus of claim 6, wherein a plurality of reference pictures are used for predicting said plurality of image blocks of said picture, and wherein a reference picture index indicates which reference picture is used for predicting said image block.

10. The apparatus of claim 6, wherein said number of one or more reference picture is included in a slice header.

11. A non-transitory computer readable medium having computer readable program code embodied thereon, the computer readable program code comprising:
program code for receiving, in a bitstream, a signal indicative of a number of one or more reference pictures allowed to be used for predicting a plurality of image blocks of a picture;
program code for receiving, in said bitstream, a signal indicative of a weighting factor for each slice or each picture of said one or more reference pictures, and said one or more reference pictures including a single reference picture for predicting an image block of said picture;
program code for predicting said image block, using said single reference picture and the weighting factor received for said single reference picture; and program code for decoding said image block based on said predicted image block.

12. The medium of claim 11, said program code for predicting comprising:
   program code for generating a motion compensated predictor for said image block using said single reference picture; and
   program code for weighting said motion compensated predictor using said weighting factor received for said single reference picture.

13. The medium of claim 12, said program code for decoding comprising:
   program code for adding said weighted motion compensated predictor to residual data for said image block.

14. The medium of claim 11, wherein a plurality of reference pictures are used for predicting said plurality of image blocks of said picture, and wherein a reference picture index indicates which reference picture is used for predicting said image block.

15. The medium of claim 11, wherein said number of one or more reference pictures is included in a slice header.

* * * * *